July 13, 1926.    1,592,093
J. FOUCAULT
PIPE UNION
Filed Dec. 16, 1920
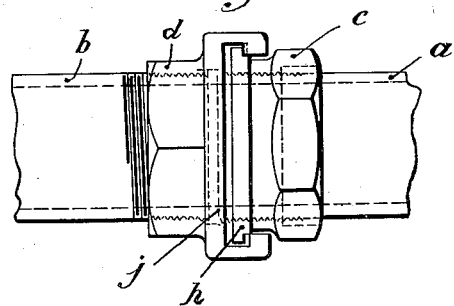
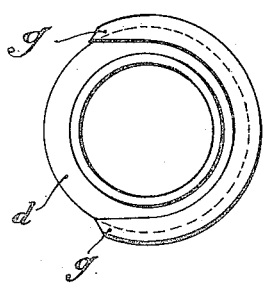 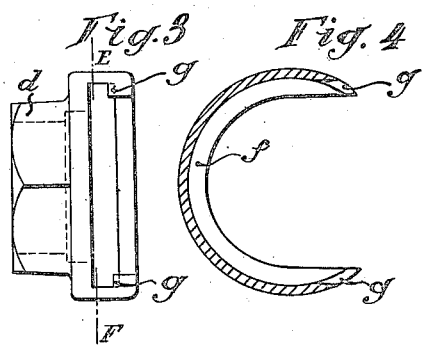
Inventor
Jacques Foucault
by B Singer Atty Patented July 13, 1926.

1,592,093

UNITED STATES PATENT OFFICE.

JACQUES FOUCAULT, OF PARIS, FRANCE.

PIPE UNION.

Application filed December 16, 1920, Serial No. 431,299, and in France September 11, 1913.

I have filed applications for this patent as follows: France, patent application No. 462,447, September 11, 1913; Germany, patent application No. 311,899, June 7, 1914; France, patent application No. 470,758, April 10, 1914; Belgium, patent application No. 287,949, June 26, 1920; England, patent application No. 145,703, June 30, 1920; Sweden, patent application No. 55,786, December 8, 1920; Norway, patent application No. 35,347, December 7, 1920; Denmark, patent application No. 28,668, November 29, 1920; Holland, patent application No. 8,025, December 11, 1920; Italy, patent application No. 193,699, December 6, 1920.

The invention relates to unions for pipes in which the junction is effected by means of rings that can engage laterally with each other.

The inner ring has a collar which can penetrate laterally into a groove of the outer ring. After its lateral introduction the inner ring is moved axially so as to engage with stops which prevent accidental separation.

On the annexed drawings:

Fig. 1 is a side view showing a pipe union in conformity with the invention.

Fig. 2 a front view of the outer ring.

Fig. 3 is a side view of the same.

Fig. 4 is a section view along E F of Fig. 3.

The pipe union in conformity with the invention comprises an inner ring $c$ screwed on the screw-threaded pipe $a$ and an outer ring $d$ screwed on the screw-threaded pipe $b$. The ring $c$ has a collar or flange $h$ which engages a U groove $f$ provided in the outer ring.

The widened portion of the ring $d$ is open laterally to allow the introduction of the collar $h$ and has moreover a stop device, the object of which is to prevent accidental separation of the two rings $c$ and $d$.

In the construction illustrated in the drawing, the said device is constituted by two tongues $g$ shown in Figs. 2, 3 and 4.

Before setting the elements into place an elastic washer $i$ is put at the end of the pipe $b$. The collar $h$ having been introduced into the recess of the ring $d$, the ring $c$ is turned in a suitable direction, so as to tighten the pipe $a$ against the ring $j$. This ensures a tight joint and the collar $h$ held laterally by the tongues $g$ cannot become disengaged from the ring $d$.

Instead of being screwed on the tube $b$, the ring $d$ could be connected otherwise with the said pipe or even be integral with it.

Unions according to the invention can obviously be utilized for connecting pipes of any shape, straight or bent.

I claim:

A pipe coupling comprising a pair of pipes having threaded ends and a plastic packing ring between their ends, two nuts which are screwthreaded throughout their entire length, and are traversed from end to end each by one of said pipes one of the said nuts having a lateral aperture and being applied against the screwthreaded end of one of said pipes, the second nut cooperating with the first named nut and being provided with a flange and freely engaged upon the screwthreaded end of the second pipe, and so arranged that the rotation of the last-mentioned nut moves forward the pipe which traverses it and presses the end of the said pipe toward the end of the first-mentioned pipe and compresses said packing ring between the pipe ends.

In witness whereof I affix my signature.

JACQUES FOUCAULT.